(12) United States Patent
Gregor et al.

(10) Patent No.: US 7,353,789 B2
(45) Date of Patent: Apr. 8, 2008

(54) ANGULAR CAMSHAFT POSITION ADJUSTMENT DRIVE

(75) Inventors: Mathias Gregor, Stuttgart (DE); Jens Meintschel, Esslingen (DE); Thomas Stolk, Kirchheim (DE); Alexander Von Gaisberg-Helfenberg, Beilstein (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/584,337

(22) Filed: Oct. 20, 2006

(65) Prior Publication Data

US 2007/0056542 A1 Mar. 15, 2007

Related U.S. Application Data

(63) Continuation-in-part of application No. PCT/EP2005/003813, filed on Apr. 12, 2005.

(51) Int. Cl.
*F01L 1/34* (2006.01)

(52) U.S. Cl. ............................ 123/90.17; 123/90.15; 123/90.31

(58) Field of Classification Search ............. 123/90.15, 123/90.16, 90.17, 90.18, 90.27, 90.31; 464/160
See application file for complete search history.

(56) References Cited

U.S. PATENT DOCUMENTS 4,604,916 A  8/1986  Distin, Jr.
5,167,594 A  12/1992  Egan
5,680,837 A  10/1997  Pierik
6,129,061 A *  10/2000  Okuda et al. ............. 123/90.17
6,523,512 B2 *  2/2003  Axmacher et al. ....... 123/90.17

FOREIGN PATENT DOCUMENTS

| | | |
|---|---|---|
| DE | 41 10 195 C2 | 10/1992 |
| DE | 41 33 408 C2 | 4/1993 |
| DE | 198 01 679 A1 | 1/1998 |
| DE | 197 02 670 A1 | 3/1998 |
| DE | 100 38 354 C2 | 2/2002 |
| EP | 0 143 368 | 6/1985 |
| EP | 0 365 339 A1 | 4/1990 |
| EP | 0 918 142 A2 | 5/1999 |
| GB | 2 224 093 A | 4/1990 |
| GB | 2 224 094 A | 4/1990 |
| WO | 02/101207 | 12/2002 |

* cited by examiner

*Primary Examiner*—Ching Chang
(74) *Attorney, Agent, or Firm*—Klaus J. Bach

(57) ABSTRACT

In an adjusting mechanism having an adjusting device for adjusting a phase position of a camshaft in relation to a crankshaft of an internal combustion engine, and a drive gear driven by the crankshaft, for driving the camshaft, a four-shaft transmission configured as an epicyclic summing gear train for the adjustment of the phase position of the camshaft is provided in a housing from which four shafts extend and two of them are concentric for connection to corresponding shafts of a control motor capable of applying different braking torques to the two concentric shafts.

11 Claims, 4 Drawing Sheets

ANGULAR CAMSHAFT POSITION ADJUSTMENT DRIVE

This is a Continuation-In-Part Application of pending international patent application PCT/EP2005/003813 filed Apr. 4, 2005 and claiming the priority of German patent application 10 2004 018 942.0 filed Apr. 20, 2004.

BACKGROUND OF THE INVENTION

The invention relates to a camshaft adjusting mechanism for adjusting the phase position of a camshaft relative to a camshaft drive or crankshaft of an internal combustion engine.

Variable valve timing in order to optimize the fuel consumption and engine power output in motor vehicles is already known. It is possible, for example, to adjust the phase position of a camshaft in relation to the crankshaft in order to vary the valve actuation. Such arrangements for adjusting the phase position usually take up a relatively large overall space, which is not readily available in modern vehicles accommodating numerous assemblies. In order to adjust the phase position, use may be made, for example, of a hydraulic vane adjuster, the rate and angle of adjustment of which, however, are very limited. At low engine speeds and low oil pressure, and when the vehicle is at standstill, the phase position cannot be adjusted.

These problems can be avoided by using electrically driven adjusting mechanisms. The published patent application DE 100 38 354 A1 discloses an electrically driven adjusting mechanism having an adjusting device for adjusting the phase position of the camshaft in relation to a crankshaft driven by an internal combustion engine, together with a drive gear, driven by the crankshaft, for driving the camshaft, in which a swash plate mechanism is provided. Such an arrangement, however, entails high costs because of the highly geared two-stage transmission and the servomotor which are required.

DE 41 33 408 A1 discloses a camshaft adjusting mechanism in the form of a four-shaft transmission in which two drive shafts are provided for adjustment, which can be simultaneously subjected to a brake torque.

It is the object of the present invention is to provide a very compact and inexpensive camshaft adjusting mechanism.

SUMMARY OF THE INVENTION

In an adjusting mechanism having an adjusting device for adjusting a phase position of a camshaft in relation to a crankshaft of an internal combustion engine, and a drive gear driven by the crankshaft, for driving the camshaft, a four-shaft transmission configured as an epicyclic summing gear train for the adjustment of the phase position of the camshaft is provided in a housing from which four shafts extend and two of them are concentric for connection to corresponding shafts of a control motor capable of applying different braking torques to the two concentric shafts.

Such a four-shaft transmission permits a high rate of adjustment when adjusting a phase position of a camshaft in relation to a crankshaft, whilst a theoretically unlimited range of adjustment is possible. It is particularly advantageous if the four-shaft transmission is employed in a form wherein two coupled gear trains are configured as epicyclic gear trains and have a kinematic degree of freedom of 2. This kinematic degree of freedom means that two arbitrarily definable speeds of two shafts determine the speeds of the other two shafts. Depending on the transmission structure a kinematic degree of freedom of 3 is also feasible, in which three arbitrarily definable speeds of three shafts determine the speed of the fourth shaft. The first and the second drive shaft are coaxial. A drive gear, in particular a sprocket wheel, forms a first input, a first and a second control input from drive shafts form a second and third input and the fourth shaft forms a transmission output. The two control inputs can be subjected to a torque for adjusting the phase position, whilst the transmission output is connected to the camshaft.

In a first embodiment and a second embodiment of the invention, the two epicyclic gear trains may be configured as a coupled gear train, or in a third embodiment they may take the form of a single planetary transmission.

The adjusting mechanism can be easily controlled if the two control inputs can be subjected to a drive and/or braking torque. Where a braking torque (brake torque) is used, it may serve to produce both an advancing and a retarding adjustment. The two control inputs can preferably be subjected to a variable brake torque. In the case of a self-locking mechanism, the phase position is constant when there is no power input.

With the drive gear arrested, a negative gear ratio (speed-reducing mechanism) prevails between the first control input and the camshaft, and a positive gear ratio (speed-increasing mechanism) between the second control input and the camshaft, that is to say, in the case of a speed-reducing mechanism, the direction of rotation of the input is opposite to the direction rotation of the output, whereas in the case of a speed-increasing mechanism the direction of rotation remains the same. For maintaining a phase position constant, both control inputs can be operated at camshaft speed, which corresponds to a coupling with no relative movement in the mechanism. In the case of a self-locking mechanism between the drive gear and the camshaft no additional brake torque is needed for this purpose. If the mechanism is not self-locking, the same effect can be achieved through an additional brake torque, for example between two of the four shafts extending from the transmission or two parts rotating in opposition in adjustment sequences. In order to adjust the phase position, either of the two control inputs can be subjected to a brake torque, in particular a variable brake torque. The two control inputs are preferably connected to an electric drive motor, which preferably has coaxial shafts. If the first control input is braked on coupling, the camshaft will be advanced. The more lightly braked or entirely free-running second control input is in this case accelerated to a speed which is greater than the current camshaft speed. When the second control input is braked, the camshaft is retarded. The more lightly braked or entirely free-running first control input is in this case accelerated to a speed which is greater than the current camshaft speed. In both directions therefore rates of adjustment vary according to the gear ratio and the brake torque. Even a relatively low efficiency of such a transmission is acceptable. It has the advantages of a simplified bearing, and a tolerance in respect of a reduced gearing quality, and corresponding cost savings.

A simple adjusting mechanism construction results if a first gear train and a second gear train have planet wheels that can be driven at least indirectly by the drive gear.

A compact device is achievable if the first and the second drive shaft of the control inputs and the camshaft are arranged on a common axis of rotation.

In a particular embodiment of the invention the first gear train comprises a loose first planet gear rotating about a first sun gear and the second gear train is a loose second planet gear rotating about a second sun gear. The two gear trains are suitably separated by a separating disk lying axially between the two gear trains. One of the gear trains is preferably designed as speed-increasing mechanism and the other as speed-reducing mechanism.

In another embodiment, the first gear train comprises a planet gear supported on a first eccentric and the second gear train comprises a planet gear supported on a second eccentric. The first planet gear and the second planet gear can suitably be driven in parallel by an internal gear connected to the drive gear, which provides for an especially simple and compact construction. In an advantageous further embodiment the first planet gear can be brought into meshing engagement with a first internal ring gear and the second planet gear can be brought into meshing engagement with a second internal ring gear, the internal ring gears being rotationally locked to the camshaft.

In a third embodiment of the invention the first gear train comprises planet gears which are each supported on a planet carrier and orbit about a first sun gear and the second gear train comprises planet gears which are each supported on a planet carrier and orbit about a second sun gear. The planet carriers of the second gear train are preferably rotationally locked to the drive gear.

The invention will be explained in more detail below with reference to an exemplary embodiment described below with reference to the accompanying drawings.

DESCRIPTION OF PARTICULAR EMBODIMENTS

Figure 1:
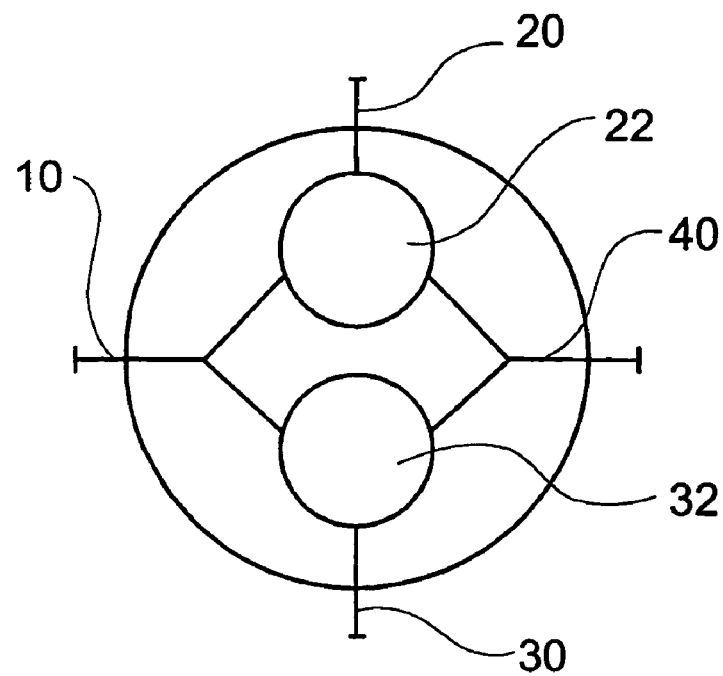
FIG. 1 Is a schematic representation of a four-shaft transmission.

In the figures fundamentally identical or functionally similar parts are indicated by the same reference numerals.

FIG. 1 shows symbolically a preferred adjusting mechanism with a control device in the form of a four-shaft transmission for adjusting a phase position of a camshaft 40 in relation to a crankshaft (not shown) of an internal combustion engine (not shown), and with a drive gear 10 driven by the crankshaft for driving the camshaft 40.

Four shafts extend from the adjusting mechanism which comprises a drive gear 10, two control inputs with drive shafts 20, 30 and a transmission output, which is connected to the camshaft 40.

Each of the drive shafts 20, 30 of the control inputs acts on an associated gear train 22 and 32 respectively, designed as an epicyclic gear train. The two control inputs can be subjected to a drive and/or braking torque (brake torque).

The two gear trains 22, 32 in the form of epicyclic gear trains can in turn be designed as a coupled gear train or as a single planetary transmission.

Figure 2:
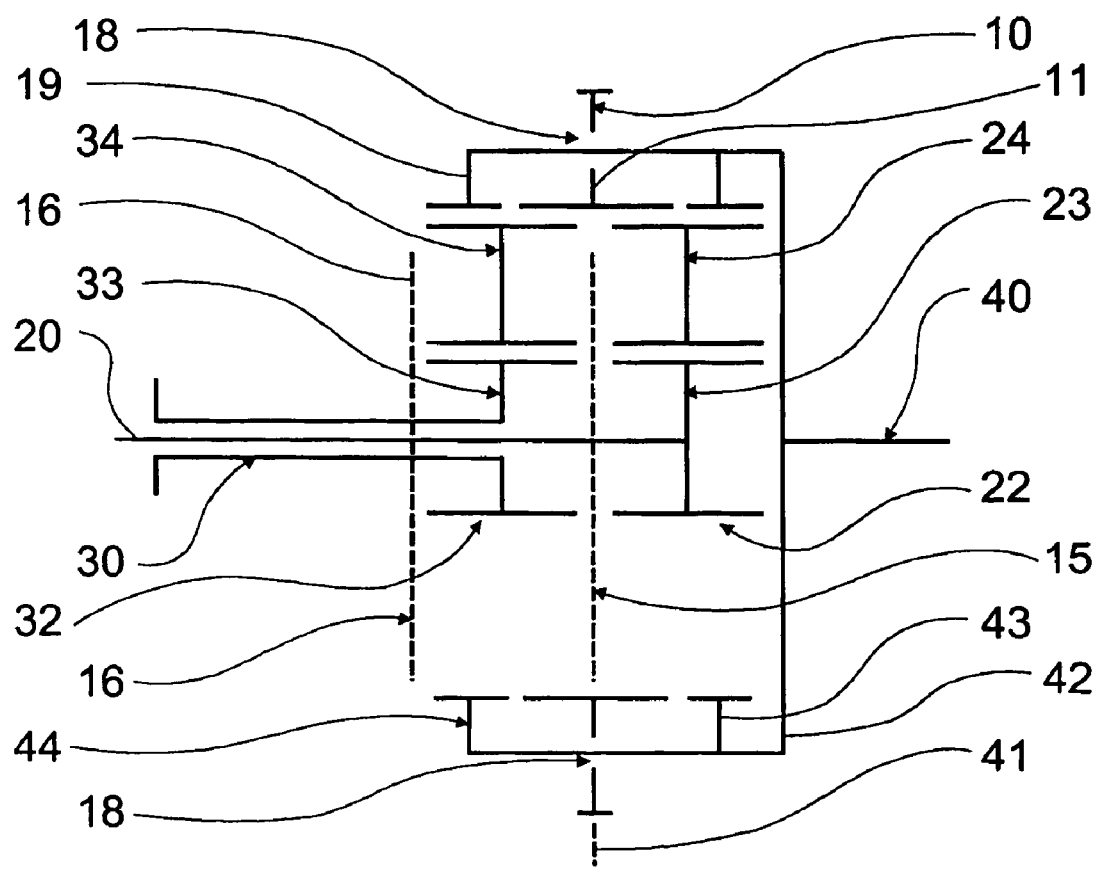
FIG. 2 shows a schematically a first embodiment of an adjusting mechanism having two gear trains with sun gears and planet gears.

FIG. 2 shows a first preferred embodiment of the adjusting mechanism according to the invention. A first gear train 22 and a second gear train 32, which are separated from one another by a separating disk 15, are arranged in a common housing 19. One of the two gear trains 22, 32 is designed as speed-increasing mechanism, the other as speed-reducing mechanism. Two control inputs have coaxial drive shafts 20, 30. A drive gear 10 in the form of a sprocket wheel is connected to a central drive internal gear 11. The drive gear 10 is drive-connected to a crankshaft (not shown) by way of a chain drive 41. Two output internal gears 43, 44 are arranged axially in front of and behind the drive internal gear 11 and are rotationally locked to a camshaft 40 on the transmission output. For this purpose corresponding apertures 18 are provided as annular segmental openings in the drive gear 10. A tooth profile modification means that, despite different numbers of teeth, the output internal gears 43, 44 lie on the same diameter.

Two sun gears 23, 33 are provided centrally, the drive shafts 20, 30 emerging coaxially from the housing form the control inputs. The first sun gear 23 meshes with a first, free-running planet wheel 24, which also meshes with the first output internal gear 43 and the central drive internal gear 11. It is also possible to provide more than one free-running planet wheel 24. The second sun gear 33 meshes with a second free-running planet wheel 34, which meshes with a second output internal gear 44 and the central drive internal gear 11. Here too, it is possible to provide more than one free-running planet wheel 34. The number of planet wheels 24, 34 is selected in a way that will be readily apparent to the person skilled in the art.

A carrier 42 of the two internal gears 43, 44 connected to the camshaft 40 forms a base of the housing. The first gear train 22 and the second gear train 32 are axially fixed by the carrier 42 and the separating disk 15 or a cover plate 16, which seals the housing 19 off from the outside. The coaxial drive shafts 20, 30 of the control inputs and the camshaft 40 are arranged on a common axis of rotation.

Figure 3:
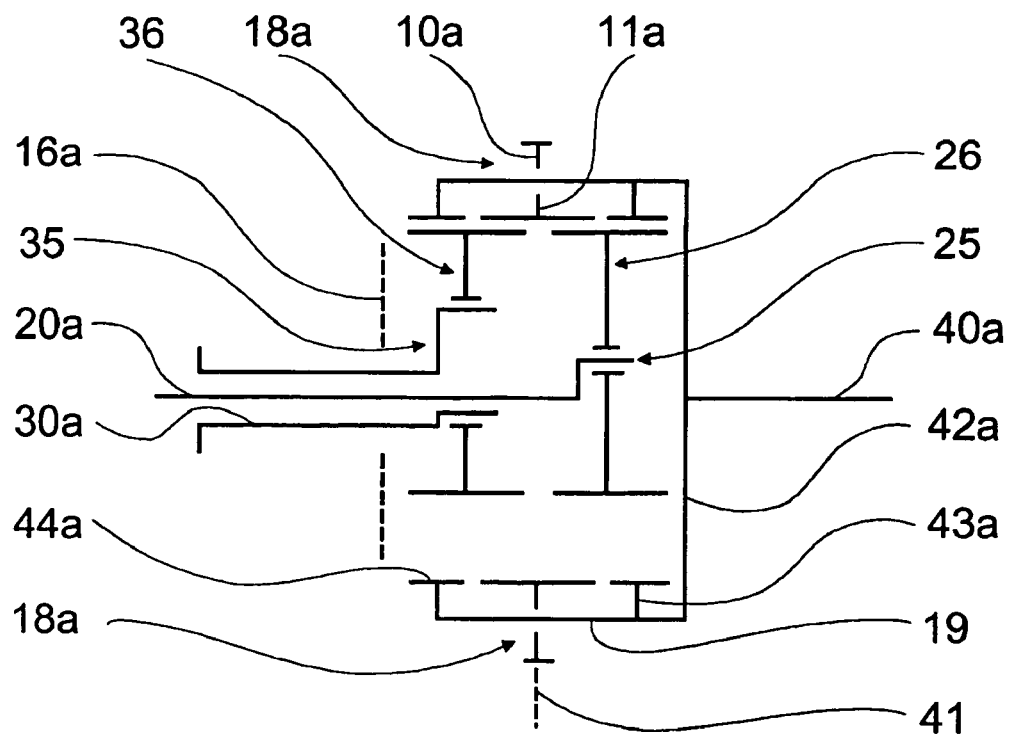
FIG. 3 is a schematic representation of a further embodiment of an adjusting mechanism with eccentric shafts.

FIG. 3 shows a preferred second development of the adjusting mechanism according to the invention. In the figures fundamentally identical or substantially similar parts are numbered with the same reference numerals, the different exemplary embodiments being distinguished by appending a letter 'a' for the second preferred development of the adjusting mechanism according to the invention.

The adjusting mechanism in many respects corresponds to the adjusting mechanism in FIG. 2 and like this forms a coupled gear train in which one of the gear trains 22a, 32a forms a speed-increasing mechanism and the other a speed-reducing mechanism. In order to avoid unnecessary repetitions, only the essential differences of the preferred development from the previous exemplary embodiment will be described. For the elements not described and their workings, reference is made to the description of FIG. 2.

The first gear train 22a in this case comprises a planet wheel 26 supported on an eccentric 25, whilst the second gear train 32a comprises a planet wheel 36 supported on an eccentric 35. Both planet wheels 26, 36 mesh with a central drive internal gear 11a and are driven in parallel by the latter, and in each case mesh with an output internal gear 43a, 44a. A tooth profile modification means that, despite different numbers of teeth, the output internal gears 43a, 44a lie on the same circumference. The drive shafts 20a, 30a of the eccentrics 25, 35 are led coaxially out of the adjusting mechanism. Of the two gear trains 22a, 32a, one is again designed as speed-increasing mechanism and one as speed-reducing mechanism.

Figure 4:
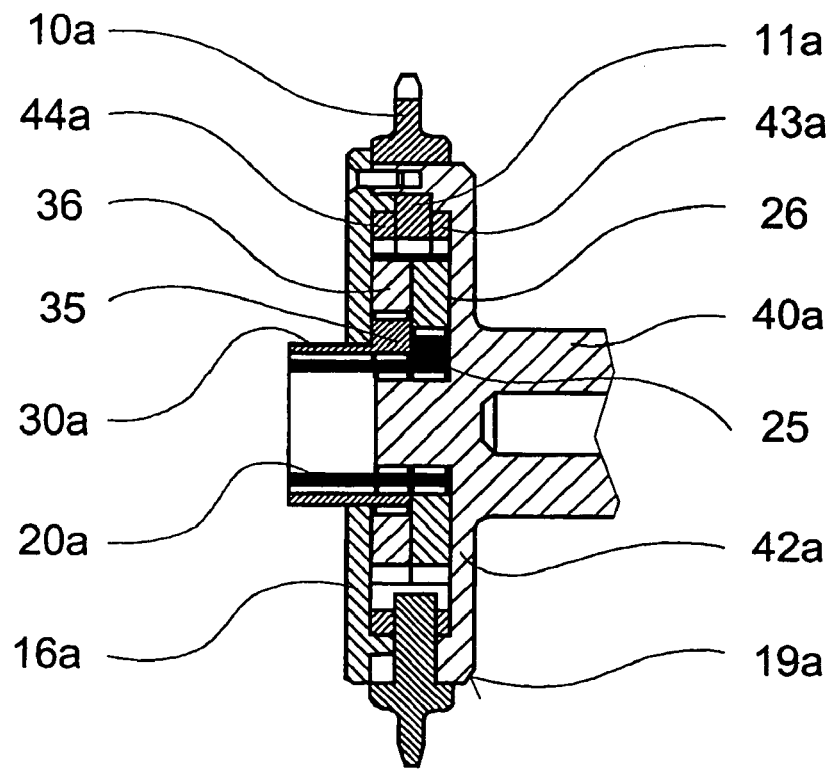
FIG. 4 is a sectional representation of the adjusting mechanism in FIG. 3.

FIG. 4 shows a longitudinal section through the adjusting mechanism in FIG. 3. The compact construction of the adjusting mechanism will be apparent therefrom, the carriers 42a, the output internal gears 43a, 44a, the drive gear 10a and the cover plate 16a forming the housing 19a. The eccentrics 25 and 35 connected to the coaxial drive shafts 20a and 30a carry the planet wheels 26 and 36 respectively, which mesh with the drive internal gear 11a and with the output internal gears 43a and 44a respectively. The cover plate 16a is bolted to the carrier 42a.

Figure 5:
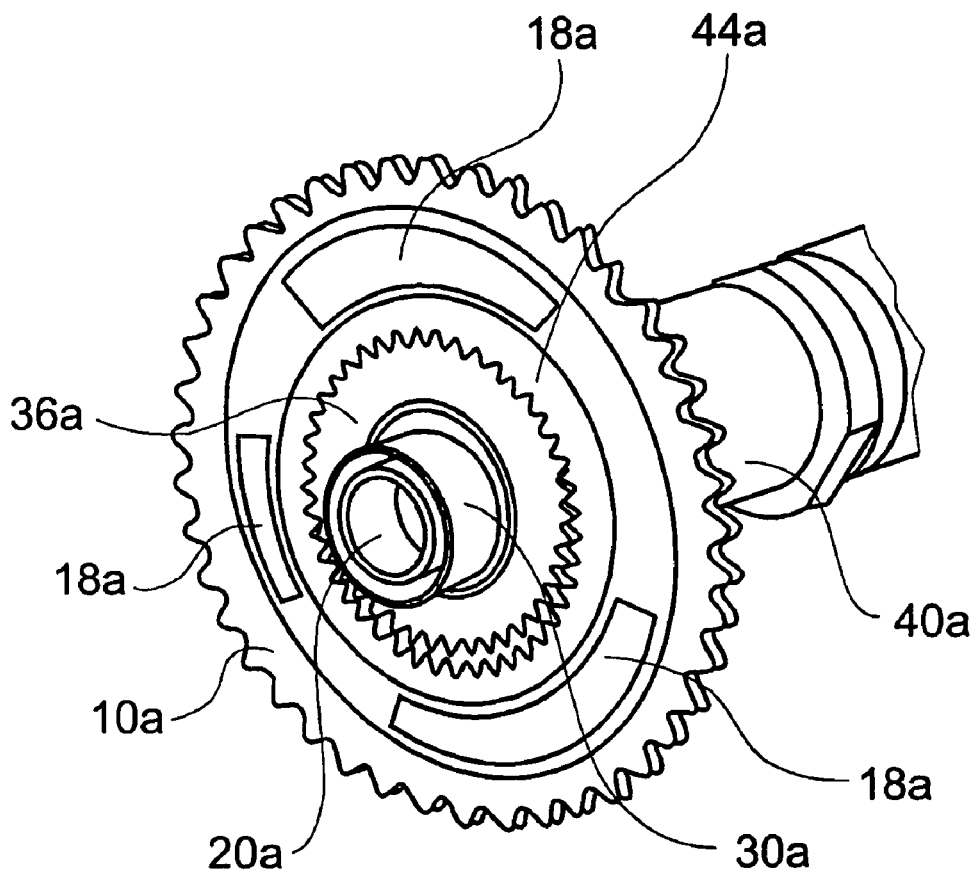
FIG. 5 shows the adjusting mechanism in FIG. 3 without cover plate.
Figure 6:
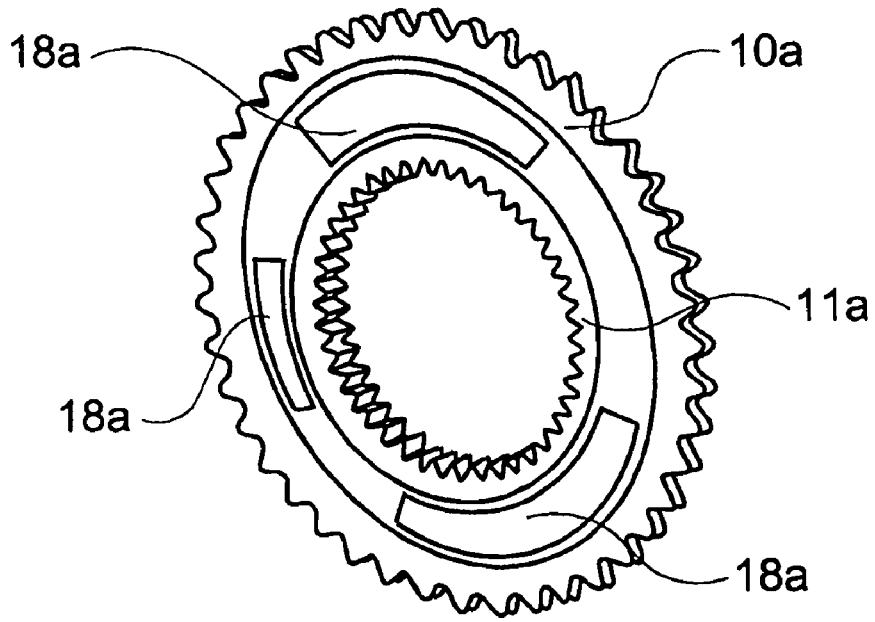
FIG. 6 shows a drive gear with central internal gearing of the adjusting mechanism in FIG. 3.

FIGS. 5 and 6 show a three-dimensional view of details of the adjusting mechanism, which is described in FIGS. 3 and 4. A view without cover plate 16a shows the coaxial drive shafts 20a, 30a and the planet wheel 36a of the second gear train 32a. From the inside outwards, the drive shafts 20a, 30a are enclosed by the planet wheel 36a and the latter by the output internal gear 44a. Arranged axially below the output internal gear 44a towards the camshaft 40a is the drive gear 10a, which is connected to the central drive internal gear 11a, which is hidden from view. The output internal gear 44a is attached to the camshaft 40a through annular segmental apertures 18a in the drive gear 10a. The drive gear 10a with the annular segmental apertures 18a and the central drive internal gear 11a fixed to the drive gear 10a is represented in FIG. 6. The drive gear 10a may be welded to the drive internal gear 11a or fixed in some other suitable way. The drive gear 10a may optionally also be integrally formed with the drive internal gear 11a.

Figure 7:
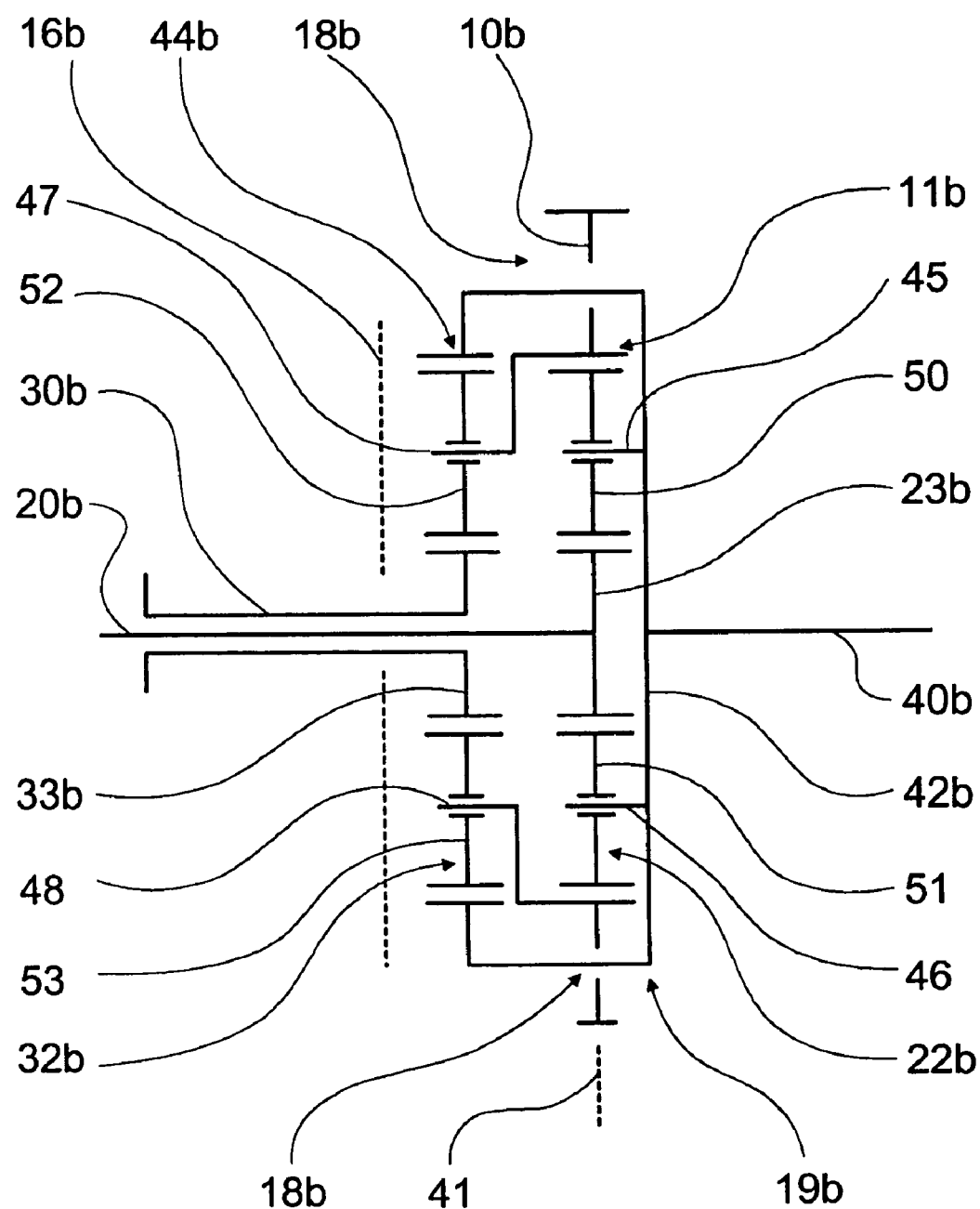
FIG. 7 shows schematically a further development of an adjusting mechanism with single planet gears.

FIG. 7 shows a third embodiment of the adjusting mechanism according to the invention, which has two gear trains 22b, 32b in the form of single-stage planetary transmissions. In the figures fundamentally identical or substantially similar parts are numbered with the same reference numerals, the different exemplary embodiments being distinguished by appending a letter 'b' for the third preferred embodiment of the adjusting mechanism according to the invention. In order to avoid unnecessary repetitions, only the essential differences of the preferred development from the previous exemplary embodiments will be described. For the elements not described and their workings, reference is made to the description of FIG. 2.

The first gear train 22b forms a speed-increasing mechanism and the second gear train 32b a speed-reducing mechanism. A drive gear 10b is fixed to a drive internal gear 11b and to each planet carrier 47 and 48 of the second gear train 32b. Annular segmental apertures 18b are provided in the drive gear 10 for the connection to the drive internal gear 11b. A camshaft 40b at the transmission output is connected to planet carriers 45, 46 of the first gear train 22b and to an output internal gear 44b of the second gear train 32b. The drive internal gear 11b and the two planet carriers 47, 48 are arranged radially on different diameters.

Two sun gears 23b, 33b are connected to control inputs of the adjusting mechanism by coaxial shafts 20b, 30b. Rotating about the sun gear 23b of the first gear train 22b are planet wheels 50, 51, each supported on a planet carrier 45, 46. Planet gears 52, 53, each supported on a planet carrier 47, 48 rotate about the sun gear 33b of the second gear train 32b. It is also possible to provide more than two planet wheels 50, 51 and 52, 53 for each gear train 22b, 32b.

What is claimed is:

1. An angular camshaft position adjustment drive mechanism for adjusting a phase position of a camshaft (40, 40a, 40b) in relation to a crankshaft of an internal combustion engine, comprising a drive gear (10, 10a, 10b), driven by the crankshaft for driving the camshaft (40, 40a, 40b), a four-shaft transmission in the form of an epicyclic summing gear train disposed in a housing (19, 19a, 19b), from which four shafts (10, 10a, 10b, 20, 20a, 20b, 30, 30a, 30b, 40, 40a, 40b) extend, said drive gear (10, 10a, 10b), forming a drive input, first and second control shafts (20, 20a, 20b, 30, 30a, 30b) forming second and third inputs, and the fourth shaft (40, 40a, 40b) forming a transmission output connected to said camshaft (40, 40a, 40b), said two control shafts (20, 20a, 20b, 30, 30a, 30b) adapted to the simultaneous subjection to a brake torque, said control shafts (20, 20a, 20b, 30, 30a, 30b) being coaxial for connection to coaxial shafts of a control motor, one control input shaft running freely or being more lightly braked than the other control input shaft for an adjustment of the phase position of the camshaft relative to the crankshaft.

2. The adjusting mechanism as claimed in claim 1, wherein each of the two control input shafts can be subjected to one of a drive and a braking torque.

3. The adjusting mechanism as claimed in claim 1, wherein, with the drive gear (10, 10a, 10b) arrested, a negative gear ratio prevails between the first control shaft and the camshaft (40, 40a, 40b), and a positive gear ratio prevails between the second control shaft and the camshaft (40, 40a, 40b).

4. The adjusting mechanism as claimed in claim 1, wherein the first and the second control shafts (20, 20a, 20b, 30, 30a, 30b) and the camshaft (40, 40a, 40b) have a common axis of rotation.

5. The adjusting mechanism as claimed in claim 1, wherein a first gear train (22, 22a, 22b) and a second gear train (32, 32a, 32b) have planet wheels (24, 26, 50, 51, 34, 36, 52, 53) that can be driven at least indirectly by the drive gear (10, 10a, 10b).

6. The adjusting mechanism as claimed in claim 5, wherein the first gear train (22b) comprises planet gears (50, 51) which are each supported on a planet carrier (45, 46) so as to be rotatably supported for orbiting about a first sun gear (23b) and the second gear train (32b) comprises planet gears (52, 53) each rotatably supported on a planet carrier (47, 48) for orbiting about a second sun gear (33b) with which the planet gears are in meshing engagement.

7. The adjusting mechanism as claimed in claim 6, wherein the planet carriers (47, 48) of the second gear train (32b) are rotationally locked to the drive gear (10b).

8. The adjusting mechanism as claimed in claim 5, wherein the first gear train (22) comprises a first planet gear (24) freely rotating about a first sun gear (23) and the second gear train (32) comprises a second planet gear (34) freely rotating about a second sun gear (33).

9. The adjusting mechanism as claimed in claim 5, wherein the first gear train (22a) comprises a planet gear (26) supported on a first eccentric (25) and the second gear train (32a) comprises a planet gear (36) supported on a second eccentric (35).

10. The adjusting mechanism as claimed in claim 9, wherein the first planet gear (24, 26) is in meshing engagement with a first output internal gear (43, 43a) and the second planet gear (34, 36) is meshing engagement with a second output internal gear (44, 44b), said output gears being rotationally locked to a carrier (42, 42a) connected to the camshaft (40, 40a).

11. The adjusting mechanism as claimed in claim 5, wherein the first planet gear (24, 26) and the second planet gear (34, 36) are in meshing engagement with, in parallel, with an internal gear (11, 11a) connected to the drive gear (10, 10a).

* * * * *